United States Patent
Kahlon et al.

(10) Patent No.: US 7,784,035 B2
(45) Date of Patent: Aug. 24, 2010

(54) METHOD FOR THE STATIC ANALYSIS OF CONCURRENT MULTI-THREADED SOFTWARE

(75) Inventors: Vineet Kahlon, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1387 days.

(21) Appl. No.: 11/174,791

(22) Filed: Jul. 5, 2005

(65) Prior Publication Data

US 2007/0011671 A1   Jan. 11, 2007

(51) Int. Cl.
*G06F 9/45* (2006.01)
(52) U.S. Cl. ...................................................... 717/133
(58) Field of Classification Search ................. 717/133
See application file for complete search history.

(56) References Cited

U.S. PATENT DOCUMENTS

| | | | | |
|---|---|---|---|---|
| 5,999,729 A * | 12/1999 | Tabloski et al. | ............ | 717/105 |
| 6,343,371 B1 * | 1/2002 | Flanagan et al. | ............ | 717/124 |
| 6,714,958 B1 * | 3/2004 | Tudor | ......................... | 718/100 |
| 6,817,009 B2 * | 11/2004 | Flanagan et al. | ............ | 717/126 |
| 6,851,075 B2 * | 2/2005 | Ur et al. | ........................ | 714/36 |
| 7,373,554 B2 * | 5/2008 | Chandrasekaran | ........... | 714/38 |
| 7,516,446 B2 * | 4/2009 | Choi et al. | ................... | 717/128 |
| 7,549,150 B2 * | 6/2009 | Yu | ............................... | 718/108 |
| 2002/0199173 A1 * | 12/2002 | Bowen | ........................ | 717/129 |
| 2005/0097561 A1 * | 5/2005 | Schumacher et al. | ........ | 718/106 |
| 2005/0283780 A1 * | 12/2005 | Karp et al. | ................... | 718/100 |
| 2006/0218534 A1 * | 9/2006 | Kahlon et al. | ................ | 717/124 |
| 2008/0126803 A1 * | 5/2008 | Ginter et al. | ................. | 713/168 |
| 2009/0199162 A1 * | 8/2009 | Choi et al. | ................... | 717/124 |

OTHER PUBLICATIONS

Rinard et al., Eliminating Synchronization Bottlenecks Using Adaptive Replication, May 2003, ACM, pp. 316-359.*
Yu et al., Race Track: Efficient Detection of Data Race Conditions via Adaptive Tracking, Oct. 23, 2005, ACM, pp. 221-234.*
Boyapati et al., Ownership Types for Safe Programming . . . , Nov. 4, 2002, ,ACM, pp. 1-20.*

\* cited by examiner

*Primary Examiner*—John Chavis
(74) *Attorney, Agent, or Firm*—Jeffrey Brosemer; Joseph Kolodka

(57) ABSTRACT

A method for the static analysis of concurrent multi-threaded software which bypasses the state explosion situation that plagues the prior art, thereby making our method scalable while—at the same time—producing no loss in precision. Our inventive method maintains patterns of lock acquisition and lock release by individual threads by constructing augmented versions of the threads. Once the augmented versions have been constructed, our inventive method verifies the concurrent program using existing tools for the verification of sequential programs—thereby greatly reducing implementation overhead. Finally, our inventive augmentation and method is carried out in an automatic manner—without requiring user intervention.

10 Claims, 6 Drawing Sheets

Global Locks: a,b,c

```
foo_nested () {
    acquire(a) ;
    acquire(b) ;
    bar() ;
    release(c) ;
}
```

```
bar() {
    release(b) ;
    release(a) ;
    acquire(c) ;
}
```

```
foo_non_nested() {
    acquire(b) ;
    acquire(a) ;
    bar() ;
    release(c);
}
```

FIG 3

```
thread_one () {
    c1: acquire(a) ;
    c2: acq_rel_c() ;
    c3: acquire(b) ;
    c4: release(b) ;
    c5: release(a) ;
} acq_rel_c() {
    d1: acquire(c) ;
    d2: release(c) ;
}
acq_rel_b() {
    h1: acquire(b) ;
    h2: release(b) ;
} thread_two() {
    g1: acquire(c) ;
    g2: acquire(d) ;
    g3: acq_rel_b();
    g4: release(d) ;
}
```

FIG 4

```
acquire(lk);
possession_lk := true;
for each lock l;
    if (possession_l) := true;
        history_l := history_l U {lk};
```

```
release (lk);
possession_lk := false;
history_lk := emptyset
```

FIG 6

METHOD FOR THE STATIC ANALYSIS OF CONCURRENT MULTI-THREADED SOFTWARE

BACKGROUND OF THE INVENTION

This invention relates generally to the field of software verification and in particular to a method for the static analysis of concurrent multi-threaded software.

DESCRIPTION OF THE PRIOR ART

Multi-threading is a well-known technique of enhancing the performance of a computer system by exploiting parallelism among the different components of that system. As a result, the use of multi-threaded programs is now widespread and examples of such programs which make use of multi-threading technique(s) include: operating systems, databases, and embedded systems, to name just a few.

Given their pervasiveness, it is unfortunate that debugging multi-threading programs and systems thereof is quite difficult. This difficulty is due, in part, to the fact that existing techniques for debugging sequential programs and systems are inadequate for concurrent, multi-threaded programs. One reason for that inadequacy is the presence of many possible inter-leavings among local operations of individual threads which give rise to subtle, unintended behaviors. As a result, multi-threaded programs are behaviorally complex and difficult to analyze, thereby requiring the use of formal methods of verification.

One of the most widely used techniques in the validation of sequential programs is the well-known dataflow analysis (See, e.g., T. W. Reps, S. Horwitz and S. Sagiv, "Precise Imterprocedural Dataflow Analysis via Graph Reachability", POPL, pp. 49-61, 1985), which may be viewed as a combination of abstract interpretation and model checking (See, e.g., D. A. Schmidt and B. Steffen, "Program Analysis as Model Checking of Abstract Interpretations", Static Analysis—$5^{th}$ International Symposium, LNCS 1503, pp. 351-380, 1998). With such techniques, abstract interpretation is used to obtain a finite representation of a control part of the program under analysis, while any recursion is modeled using a stack.

Fortunately, pushdown systems (PDSs) provide a natural framework to model such abstractly interpreted structures. A PDS has a finite control portion corresponding to a valuation of the variables of the analyzed program and a stack which provides a mechanism to model recursion. A dataflow analysis then exploits then exploits the fact that the model checking problem for PDSs is decidable for very expressive classes of properties—both linear and branching time. (See, e.g., A. Bouajjani, J. Esparza, and O. Maler, "Reachability Analysis of Pushdown Automata: Application to Model Checking", CONCUR LNCS 1243, pp. 135-150, 1997; and I. Walukeiwicz, "Model Checking CTL Properties of Pushdown Systems", FSATTCS, LNCS 1974, pp. 127-138, 2000)

Following this dataflow analysis for sequential programs, it has been shown that a multi-threaded program may be modeled as a system comprising multiple pushdown systems interacting with each other using a communication mechanism such as a shared variable or a synchronization primitive. (Note: henceforth, we shall use the terms "thread" and "PDS" interchangeably) While, for a single PDS the model checking problem is efficiently decidable for very expressive logics, it was shown by G. Ramalingam, in an article entitled, "Context-Sensitive Synchronization-Sensitive Analysis Is Undecidable", which appeared in *ACM Transactions of Programming Language Systems*, Vol. 22(2), pp. 416-430, in 2000, that simple properties like reachability become undecidable even for systems with only two threads—where those threads communicate using CCS—style pairwise rendezvous.

In a large percentage of real-world concurrent software however, such as databases, file systems, or device drivers, a key issue is whether conflicts exist between different threads competing for access to shared resources, and how to specifically resolve them.

As is known, conflicts in such software systems are typically resolved using locks that allow mutually exclusive access to a shared resource. Accordingly, before a thread can have access to a shared resource, it must first acquire a lock associated with that resource, and then subsequently release that lock after executing all intended operations.

For concurrent software, the interaction between concurrently executing threads is very limited, thereby making such threads loosely coupled. For example, in a standard file system, the control flow in the implementation of the various file operations is usually independent of the data being written to or read from a file. Consequently, such programs may either be directly modeled as systems comprised of PDSs communicating via locks or may be reduced to such systems either by applying standard abstract interpretation techniques or by exploiting separation of control and data. As a result, we focus our inventive discussion(s) on a model checking problem for PDSs interacting using locks.

Absence of conflicts and freedom from deadlock are among the most crucial properties that need to be checked in multi-threaded programs, particularly because checking for these properties is typically a prerequisite for verifying more complex properties. Typical conflicts include, for example, data races where two or more threads try to access a shared memory location where at least one of the accesses is a write operation. This and most other commonly occurring conflicts (may be formulated to) tend to occur pairwise among threads.

As should be readily apparent, testing multithreaded programs and systems for correctness and debugging such programs is extremely difficult. Earlier, prior-art techniques such as summarizing procedure calls or variations of partial order methods—which construct a global state space of a program—experience a debilitating state explosion problem which subsequently makes them less scalable. Other techniques such as thread modular model checking attempt to address the state explosion problem (e.g., through the use of compositionality), but lose precision and oftentimes give rise to bogus error conditions.

Accordingly, new or improved methods that facilitate the correctness of concurrent programs would represent a significant advance in the art. Our invention is directed to such a method.

SUMMARY OF THE INVENTION

We have invented a new method to verify the correctness of concurrent software having multiple-threads wherein the threads communicate using locks. In sharp contrast to prior-art methods which give rise to state space explosion situations or bogus error conditions, our inventive method is both provably efficient and exact.

Viewed from a first aspect, our inventive method reduces the problem of correctness of a concurrent program comprised of multiple threads communicating via locks—to one concerned with verifying augmented versions of each individual thread. Consequently, our inventive method bypasses the state explosion situation thereby making our technique scalable while—at the same time—producing no loss in precision.

In operation, our inventive method maintains patterns of lock acquisition and lock release by individual threads by constructing augmented versions of the threads. Once the augmented versions have been constructed, our inventive method verifies the concurrent program using existing tools for the verification of sequential programs—thereby greatly reducing implementation overhead. Finally, our inventive augmentation and method is carried out in an automatic manner—without requiring user intervention.

Further features and advantages of our inventive method will become apparent with reference to the attached Drawing.

DESCRIPTION OF THE DRAWING

FIG. 3 is a program segment GlobalLocks: a, b, c which is used to construct and discuss both nested and non-nested lock access;

FIG. 4 is a program segment of a simple concurrent program CP, comprising two threads namely Thread One, and Thread Two;

FIG. 6 is a pair of program segments, acquire(lk) and release(lk) which illustrate the code replacing acquire(lk) and release(lk) respectively, in our inventive augmented threads.

DETAILED DESCRIPTION

Figure 1:
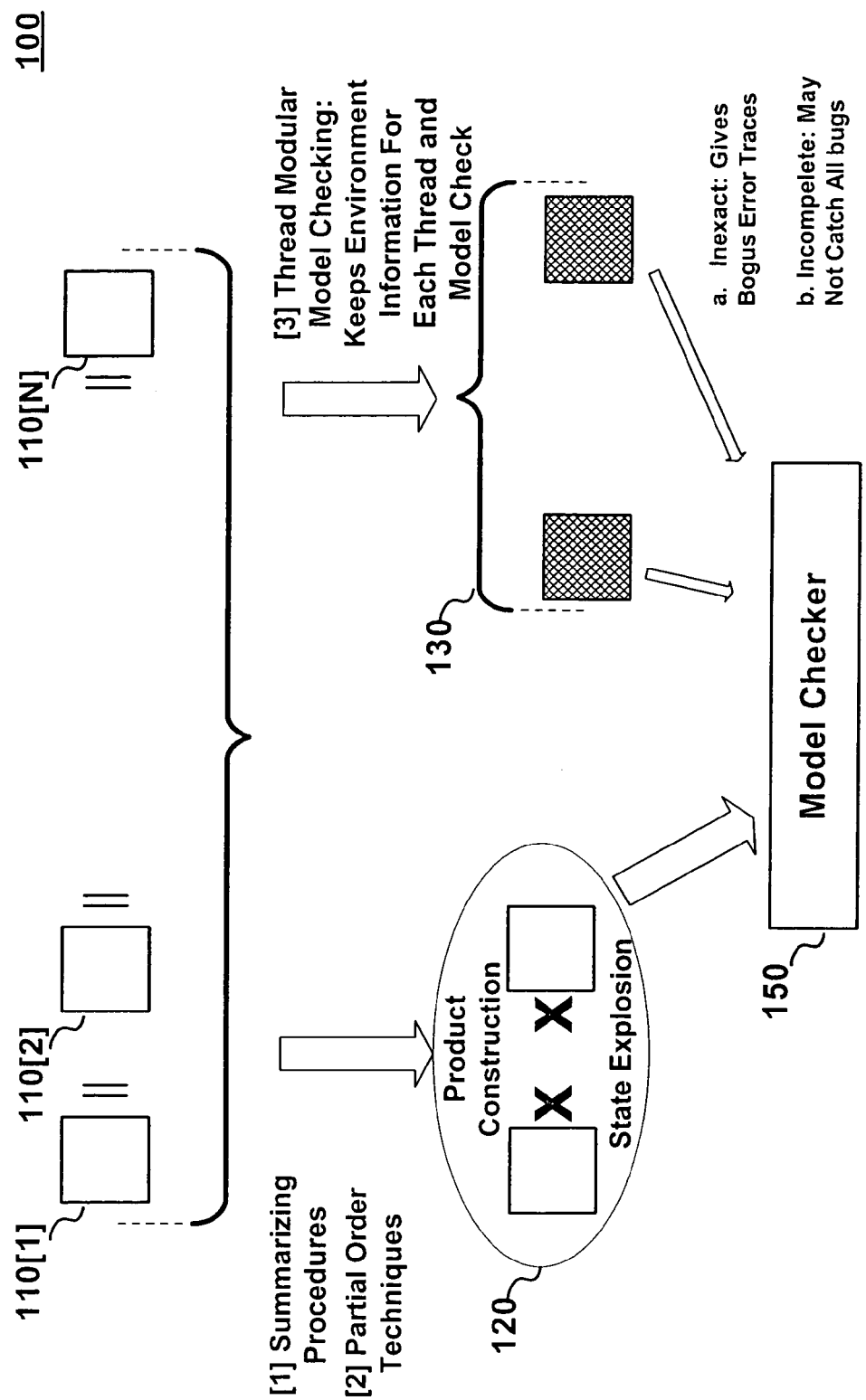
FIG. 1 is a block diagram depicting prior art approaches at concurrent software verification leading to state-explosion.

Before we begin our discussion of our inventive method, it is again worthy of note to distinguish our approach to that of the prior art. With reference to FIG. 1, there is shown a prior art approach to verification of concurrent software comprising a number of individual threads $110[1] \ldots 110[N]$.

As is shown in that FIG. 1, when prior art approaches such as summarizing procedures, or partial order techniques were employed, a state explosion 120 problem occurs that makes model checking 150 very difficult or impossible. Similarly, when thread modular model checking approaches were employed wherein environment information for each thread was kept and then model checked 150 collectively, it lead to inexact (bogus errors) or an incomplete analysis.

Figure 2:
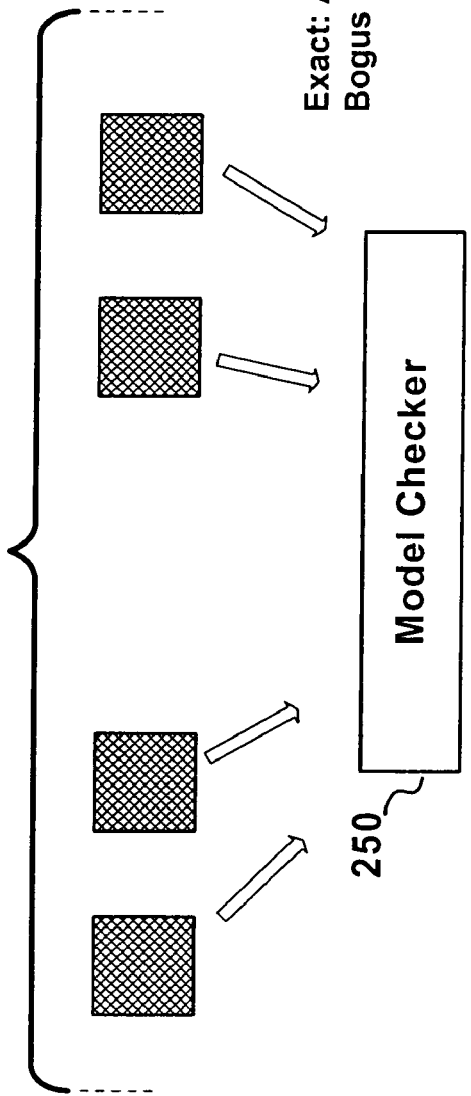
FIG. 2 is a block diagram depicting our inventive approach to concurrent software verification using augmented threads and analyzing those threads individually.

In contrast, FIG. 2 outlines, in block diagram, our inventive approach to checking concurrent software comprising multiple threads $210[1] \ldots 210[N]$, wherein augmented versions of the multiple threads are first constructed and then they are model checked 250 individually. In this manner, and in sharp contrast to the prior art, by checking the augmented threads individually we avoid the state explosion problem and bogus results that plagued the prior art.

By way of some additional background, it is again noted that the absence of conflicts and deadlock conditions are among the most crucial properties that need to be checked in multi-threaded programs, particularly because checking for these two is usually a pre-requisite for verifying complex properties. Typical conflicts include, for example data races. These, like most other commonly occurring conflicts occur pairwise among threads.

With this in mind, given a concurrent program comprised of n threads $T_1, \ldots, T_n$, we may consider correctness properties of the following forms:

Liveness: (Single Indexed Properties) $Eh(i)$ and $Ah(i)$ where $h(i)$ is an LT\X formula (built using F "eventually", U "until, G "always" but without X "nexttime") interpreted over the local control states of the PDS representing thread $T_i$, and E (for some computation starting at the initial global configuration) and A (for all computations starting at the initial global configuration) are the usual path quantifiers.

Safety: (Double Indexed Properties) $\hat{}_{i \neq j} EF(a_1 \hat{} b_j)$ where $a_i$ and $b_j$ are local control states of PDSs and $T_i$ and $T_j$, respectively.

Deadlock Function: For single-indexed properties, we may show that the model checking problem is efficiently decidable. Towards that end, given a correctness property $Eh(i)$ over the local states of thread $T_i$, we show how to reduce reasoning in an exact, for example a sound and complete manner, about a system having n threads to a system comprised of just the thread $T_i$. This reduces the problem of model checking a single-indexed LT\X formula for a system having n threads to model checking a single thread (PDS) which is known to be efficiently decidable. (See, for example, A. Bouajjani, J. Esparza and O. Maler, "Reachability Analysis of Pushdown Automata: Application to Model Checking", CONCUR, LNCS 1243, pp. 135-150, 1997).

The model checking problem for double-indexed properties is more interesting. As for single-indexed properties, we may show that we can reduce the model checking problem of $Eh(i,j)$ for a system of n threads to a system comprised of just two threads, namely $T_i$ and $T_j$. However, unlike the single index case, this still does not produce decidability of the associated model checking problem.

As such, we will show that, in general, the problem of model checking remains undecidable even for pairwise reachability, viz., properties of the form $EF(a_i \hat{} b_j)$, where $a_i$ and $b_j$ are local control states of thread $T_i$ and $T_j$, even for programs having only two threads.

Most real-world, concurrent programs however use locks in a nested fashion, viz., each thread comprising the concurrent program can only the particular lock that it last acquired and which has not yet been released. Indeed, practical programming guidelines used by software developers often require that locks be used in a nested fashion. In fact, in both the Java and C# programming languages locking is syntactically guaranteed to be nested.

In this case we shown that we can reduce reasoning about pairwise reachability of a given two-threaded program to individually model checking augmented versions of each of the two threads which, as we know, is efficiently decidable. The augmentation involves storing—for each control location of a thread—the history of locks that were acquired or released in order to get to that control location. Advantageously, and as will become apparent to those skilled in the art, by storing this information our inventive method guarantees a sound and complete reduction. In addition, it avoids the construction of the state space at hand thereby bypassing the state explosion problem discussed previously.

As a case study, we have applied our inventive method to check race conditions in a well-known file system, in particular the Daisy file system, and discover the existence of several bugs.

For our purposes here, we consider multi-threaded programs wherein the threads communicate using locks. We model each thread using a trace flow graph framework, wherein each procedure of a thread is modeled as a flow graph, and each node of which represents a control point of a procedure. The edges of the flow graph are annotated with statements that could either be assignments, calls to other procedures of the same thread or the acquisition and release of locks when the thread needs to access shared resources. Recursion and mutual procedure calls are allowed.

So that the flow graph of a program has a finite number of nodes, abstract interpretation techniques are often used in order to get a finite representation of the control states of the original thread. This typically introduces non-determinism which is explicitly allowed. As such, each thread can then be modeled as a system of flow graphs representing its procedures.

The resulting framework of finite state flow graphs with recursion can be naturally modeled as a pushdown system (PDS). A PDS has a finite control part corresponding to the valuation of the local variables of the procedure it represents and a stack which provides a mechanism to model recursion.

Formally, a PDS is a five-tuple $P=(P, Act, \Gamma, c_0, \Delta)$, where P is a finite set of control locations, Act is a finite set of actions, $\Gamma$ is a finite stack alphabet, and $\Delta \subseteq (P \times \Gamma) \times Act \times (P \times \Gamma^*)$ is a finite set of transition rules. If $((p,\gamma), a, (p', w)) \in \Delta$ then we write $$\langle p, \gamma \rangle \xrightarrow{a} \langle p', w \rangle.$$

A configuration of P is a pair (p,w), where $p \in P$ denotes the control location and $w \in \Gamma^*$ the stack content. Additionally, we call $c_0$ the initial configuration of P and the set of all configurations of P is denoted by C. Finally, for each action a, we define a relation $$\xrightarrow{a} \subseteq C \times C$$

as follows: if $$\langle q, \gamma \rangle \xrightarrow{a} \langle q', w \rangle$$

then $$\langle q', \gamma v \rangle \xrightarrow{a} \langle q', wv \rangle$$

for every $v \in \Gamma^*$.

We model multi-threaded programs using PDSs communicating via locks. For a concurrent program comprised of threads $T_1, \ldots, T_n$, a lock l is a globally shared variable taking on values from the set $\{1, \ldots, n, \perp\}$. The value of l can be modified by a thread using the operations of acquire(l) and release(l). A thread can acquire a lock l only if its value is currently $\perp$, viz., none of the other threads currently has possession of it.

Once lock l has been acquired by thread $T_i$, its value is set to i and it remains so until $T_i$ releases it by explicitly executing release(l), thereby resetting its value to $\perp$. Importantly, locks may not be pre-empted, therefore a thread cannot be forced to give up any lock previously acquired by it.

Formally, we model a concurrent program with n threads and m locks $l_1, \ldots, l_m$ as a tuple of the form $CP=(T_1, \ldots, T_n, L_1, \ldots, L_m)$, where $T_1, \ldots, T_n$ are pushdown systems (representing threads) with the same set Act of non-acquire and non-release actions, and for each $i, L_i \subseteq \{\perp, 1, \ldots, n\}$ is the possible set of values that lock $l_i$ can be assigned to.

A global configuration of CP is the tuple $c=(t_1, \ldots, t_n, l_1, \ldots, l_m)$ where $t_1, \ldots, t_n$ are, respectively, the configurations of threads $T_1, \ldots, T_n$ and $l_1, \ldots, l_m$ are the values of the locks. If no thread holds the lock in configuration c, then $l_i = \perp$, else $l_i$ is the index of the thread currently holding the lock. The initial global configuration of CP is $$(c_1, \ldots, c_n, \underbrace{\perp, \ldots, \perp}_{m}),$$

where $c_i$ is the initial configuration of thread $T_i$. Consequently, all locks are free to start with.

We extend the relation $$\xrightarrow{a}$$

to pairs of global configurations as follows. Let $c=(c_1, \ldots, n_c, l_1, \ldots, l_m)$ and $c'=(c_1', \ldots, c_n', l_1', \ldots l_m')$ be global configurations, the $$c \xrightarrow{a} c'$$

if there exists $1 \leq i \leq n$ such that $$c_i \xrightarrow{a} c_i',$$

for all $1 \leq j \leq n$ such that $i \neq j$, $c_j = c_j'$, and for all $1 \leq k \leq m$, $l_k = l_k'$.

$$c \xrightarrow{acquire(l_i)} c'$$

if there exists $1 \leq j \leq n$ such that $$c_j \xrightarrow{acquire(l_i)} c_j',$$

and $l_i = \perp$, and $l_i' = j$, for all $1 \leq k \leq n$, such that $k \neq j, c_k = c_k'$, and for all $1 \leq p \leq m$ such that $p \neq i, l_p = l_p'$.

$$c \xrightarrow{release(l_i)} c'$$

if there exists $1 \leq j \leq n$ such that $$c_j \xrightarrow{release(l_i)} c_j',$$

and $l_i = j$, and $l_i' = \perp$, for all $1 \leq k \leq n$, such that $k \neq j, c_k = c_k'$, and for all $1 \leq p \leq m$ such that $p \neq i, l_p = l_p'$.

A sequence $x=x_1, x_2, \ldots$ of global configurations of CP is a computation if $x_1$ is the initial global configuration of CP and for each i, $$x_i \xrightarrow{a} x_i + 1,$$

where either a∈Act or for some $1 \leq j \leq m$, a=release($l_j$) or a=acquire($l_j$). Given a thread $T_i$ and a reachable global configuration $c=(c_1, \ldots, c_n, l_1, \ldots l_m)$ of CP we use LockSet($T_i$,c) to denote the set of indices of locks held by $T_i$ in c, viz., the set $\{j | l_j=i\}$.

Nested versus Non-nested Lock Access: We say that a concurrent program accesses locks in a nested fashion if and only if along each computation of the program a thread can only release the last lock that it acquired along that computation which has not yet been released.

With reference now to FIG. 3, there is shown an exemplary code segment, GlobalLocks:a, b, c, which will be used to construct and discuss two, exemplary threads. For example, in that FIG. 3, a thread comprising procedures foo_nested( ), and bar( ), accesses locks a, b, and c in a nested fashion. More particularly, it acquires lock a, acquires lock b, calls procedure bar( ), which in turn releases lock b, releases lock a, acquires lock c, and then returns control to foo_nested( ). Since it always releases the most recently acquired lock first, we say that this concurrent program accesses locks in a nested fashion.

In contrast, and with continued reference to that same FIG. 3, another thread comprising procedures foo_non_nested( ), and bar( ), accesses locks a, b, and c in a non-nested fashion. In particular, this thread acquires lock b, acquires lock a, calls procedure bar( ), which in turn FIRST releases lock b, THEN releases lock a, before acquiring lock c and then returning control to foo_non_nested( ), which releases lock c. As can be readily observed from this FIG. 3, this thread comprising foo_non_nested( ) and bar( ) is non-nested because it does not release the locks in the reverse order that it acquired them.

Many to Few

If we now let CP be a concurrent program comprised of n threads $T_1, \ldots, T_n$, and let f be a correctness property either of the form $E_{fin}h(i,j)$ or of the form $A_{fin}h(i,j)$, where h(i,j) is an LT\X formula with atomic propositions over the control states of threads $T_i$ and $T_j$ and $E_{fin}$ and $A_{fin}$ quantify solely over finite computation paths. Note that since $A_{fin}$ and $E_{fin}$ are dual path quantifiers, it suffices to only consider the case where f is of the form $E_{fin}h(i,j)$. Accordingly, in order to model check the program CP(i,j) comprised solely of the threads $T_i$ and $T_j$. Importantly, this result does not require the concurrent program to have nested locks. Formally, we may show the following.

Proposition 1 (Double-Indexed Reduction Result) Given a concurrent program CP comprised of n threads $T_1, \ldots, T_n$, CP$|=E_{fin}h(i,j)$ iff CP(i,j)$|=E_{fin}h(i,j)$ where CP(i, j) is the concurrent program comprised solely of threads $T_i$ and $T_j$.

Proposition 2 (Single-Indexed Reduction Result) Given a concurrent program CP comprised of n threads $T_1, \ldots, T_n$, CP$|=E_{fin}h(i)$ iff CP(i)$|=E_{fin}h(i)$ where CP(i) is the concurrent program comprised solely of the thread $T_i$.

Similar results hold for properties of the form $E_{inf}h(i,j)$ where $E_{inf}$ quantifies solely over infinite computations.

Liveness Properties

Using proposition 2 above, we can reduce the model checking problem for a single-indexed LT\X formula f for a system having n threads to a system comprised solely of a single thread whose control states are being tracked by f. Thus the problem now reduces to model checking a pushdown system for LT\X properties which is known to be decidable in polynomial time in size of the control part of the pushdown system. We are therefore left with the following theorem.

Theorem 1: The model checking problem for single-indexed L TL\X properties for a system with n threads is decidable in polynomial time in the size of the PDS representing the thread being tracked by the property.

Safety Properties

Even though proposition 2 allows us to reduce reasoning about double-indexed LT\X properties from a system having n threads to one with only 2 (two) threads, it still does not produce the required decidability. This is because although the model checking of LT\X is decidable for a single pushdown system, it becomes undecidable for simple reachability and for systems having only two PDSs communicating via pairwise rendezvous. The proof of undecidability rests on the fact that synchronization using pairwise rendezvous couples the two PDSs tightly enough to allow construction of a system that accepts the intersection of the two given context free languages (CFLs) the non-emptiness of which is undecidable.

We may show that if we allow PDSs with non-nested lock access, then the coupling—seemingly weaker than with pairwise rendezvous—is still strong enough to build a system accepting the intersection of the CFLs corresponding to the given PDSs, thus yielding undecidability for even pairwise reachability. From a practical standpoint, this is somewhat discouraging.

However, we may exploit the observation that in most real-world concurrent programs locks are accessed by threads in a nested fashion. In fact, and as noted prior, certain programming languages such as Java and C# syntactically guarantee locks to be nested. In that case, we may advantageously reduce the model checking of LT\X properties for a concurrent program having two threads to individually model checking augmented versions of the thread for LT\X properties which, as we know, is efficiently decidable. Combining this insight with the reduction result we obtained previously, we realize that the model checking problem of doubly-indexed LT\X formulas is efficiently decidable for concurrent programs having nested locks.

Decidability of Pairwise Reachability for Nested Lock Programs

We demonstrate our inventive method and technique(s) with reference to FIG. 4, which exhibits a simple concurrent program CP comprising two threads. The two threads namely Thread One and Thread Two, comprise procedures thread_one( ); acq_rel_c( ) and thread_two( ); acq_rel_b( ), respectively.

Suppose that we are interested in determining whether EF(c4^g4). The main idea is to reduce this to checking EFc4 and EFg4 individually on the two threads. Then, given computations x and y leading to c4 and g4, respectively, we merge them to construct a computation z of CP leading to a global configuration with Thread One and Thread Two in local control states c4 and g4, respectively.

We now consider, with reference to FIG. 4, the two computations namely, x:c1,c2,d1,d2,c3,c4, and y:g1,g2,g3,h1,h2, g4 of Thread One and Thread Two, respectively. Note that at control location g4, Thread Two holds locks c and d. Also, along computation y, once Thread Two acquires lock c at location g1, it does not release it. Accordingly, we must make sure that before we execute the code at location g1 along z, all operations that acquire and release lock c along x should already have been executed.

In this sample depicted in FIG. 4, g1 must be scheduled to execute only after d2 (and therefore c1,c2,d1) has already been executed. Similarly, operation c3 of Thread One must be executed after h2 has been executed along z. Therefore, one possible computation z of CP having the desired properties is z:c1,c2,d1,d2,g1,g2,g3,h1,h2,g4,c3,c4.

We note at this point that if we replace the function call at location g3 of Thread Two by acq_rel_a( ), which first acquires and then releases lock a, there is now way to reconcile the two local computations x and y to get a global computation leading to a configuration with Thread One and Thread Two, respectively, at control locations c4 and g4—even though they are reachable in their respective, individual threads!

As can now be appreciated, this is due to the fact that in this case h2 (and hence g1,g2,g3 and h1) should be executed before c1 (and hence c2,d1,d2,c3 and c4). As before, g1 can be executed only after d2 (and hence c1,c2 and d1). From these observations, we know that g1 must be executed after h2 along z, but that violates the local ordering of the transitions executed along y, wherein g1 was executed before h2. Accordingly, our assertion made above is shown.

In general, when testing for reachability of control states c and c' of two different threads it suffices to test whether their exist paths x and y in the individual threads leading to states c and c' holding lock sets L and L' which may be acquired in a compatible manner. Compatibility ensures that we do not get a scenario as above where there exists locks a∈L and a'∈L' such that a transition acquiring a' was executed after acquiring a for the last time along x and a transition acquiring a was executed after acquiring a' for the last time along y, else we cannot reconcile x and y. We will formalize these concepts in Theorem 2, below however, first we must provide the following definition.

Definition (Acquisition History): If we let x be a global computation of a concurrent program CP leading to a global configuration c. Then for Thread $T_i$ and lock, $l_j$ of CP such that j∈LockSet($T_i$,c), we define AH($T_i$,$l_j$,x) to be the set of indices that were acquired (and possibly released by) $T_i$ after the last acquisition of $l_j$ by $T_i$ along x.

Theorem 2: (Decomposition Result) Let CP be a concurrent program comprised of the two threads $T_1$ and $T_2$ with nested locks. Then for control states $a_1$ and $b_2$ of $T_1$ and $T_2$ respectively, CP|=EF($a_1$^$b_2$) iff there are computations x and y of the individual threads $T_1$ and $T_2$, respectively, leading to configurations S with $T_1$ in control state $a_1$ and t with $T_2$ in control state $b_2$ such that:

LockSet($T_1$,s)∩Lockset($T_2$,t)=0 and there do not exist any locks l∈LockSet($T_1$,s) and l'∈LockSet($T_2$,t) with l'∈AH($T_1$,l,x) and l∈AH($T_2$,l',y).

Accordingly, and to make use of the above result, our inventive method augments the given threads to keep track of its acquisition histories. As such, given a thread P=(P,Act,Γ, $c_0$,Δ) of concurrent program CP having a set of locks L of cardinality m, we construct the augmented thread $P_A$=($P_A$, Act,Γ,$d_0$,$\Delta_A$), where $P_A$=P×$2^L$×$(2^L)^m$ and $\Delta_A$⊆(P×Γ)×(($P_A$×Γ*).

Our inventive, augmented PDA us used to track the set of locks and acquisition histories of thread T along local computations of T. As such, we let x be a computation of CP leading to global configuration s. Each control location of the augmented PDA is of the form (a, Locks, $AH_1$, . . . , $AH_m$), where a denotes the current control state of T in s, Locks is the set of locks currently held by T, and for 1≦j≦m, if $l_j$∈Locks, then $AH_j$ is the set AH(T,$l_j$,x), else it is the empty set. Lastly, the initial configuration $d_0$ is the (m+2)-tuple ($c_0$0, 0, . . . , 0) and the translation relation $\Delta_A$ is defined as follows:

$$\langle q, \text{Locks}, AH_1, \ldots, AH_m, \gamma \rangle \xrightarrow{a} \langle q', \text{Locks}', AH'_1, \ldots, AH'_m, w \rangle \in \Delta_A$$

iff
a is not a lock operation, $$\langle q, \gamma \rangle \xrightarrow{a} \langle q', w \rangle \in \Delta,$$

Locks=Locks' and for 1≦j≦m, $AH_j$=$AH'_j$;
a is the action acquire($l_k$), Locks'=Locks∪{k}, $$q \xrightarrow{acquire(l_k)} q',$$

γ=w, and for 1≦p≦m, if p∈Locks, then $AH'_p$=$AH_p$ otherwise; and
a is the action release($l_k$), Locks'=Locks\{k}, $$q \xrightarrow{release(l_k)} q',$$

γ=w,$AH_k'$=0 and for 1≦p≦m such that p≠k, $AH'_p$=$AH_p$.

Proposition 3: Given a concurrent program CP comprised of threads T and T', the model checking problem for pairwise reachability, viz, formulas of the form EF($a_1$^$b_2$) is decidable.

Figure 5:
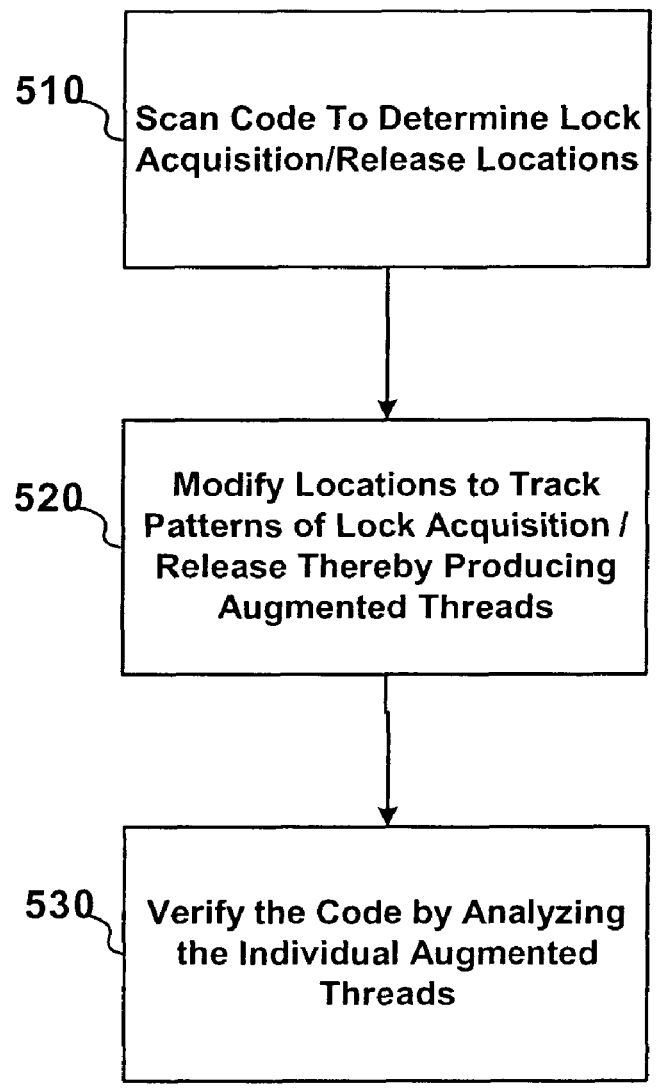
FIG. 5 is a flowchart depicting the method of the present invention.

Turning now to FIG. 5, there is shown a flowchart that provides an overview 500 of our inventive method. In particular, at block 510 we first scan the code comprising the concurrent program to determine locations at which lock acquisition/release takes place. Then, at block 520, those determined locations are modified such that it is possible to track patterns of lock acquisition/release thereby producing our inventive augmented threads. Finally, the augmented threads are individually verified at block 530, thereby verifying the overall concurrent program.

Implementation Issues. In order to implement our inventive technique to a concurrent program, we introduce for each lock l two extra global variables, possession_l and history_l, which are defined as follows:

1. possession_l: to track whether l is currently in possession of a thread; and
2. history_l: to track the acquisition history of l.

To begin, possession_l is initialized to false and history_l is initialized to the emptyset. Then, each statement of the form acquire(lk) in the original code is replaced by the following:

```
acquire(1k);
possession_1k := true;
for each lock 1
    if (possession_1) = true
        history_1 := history_1 ∪ {1k};
```

Similarly, each statement of the form release (lk) is replaced with the following:

```
release(1k);
possession_1k := false;
history_1k := emptyset;
```

These operations are shown in FIG. 6, as sample program segments.

Optimizations The above implementation advantageously keeps the acquisition history for each lock comprising the concurrent program and tests for all possible disjoint pairs L and L' of lock sets and all possible compatible acquisition histories at two given error control locations say, $a_i$ and $b_j$. In the worst case, this is exponential in the number of locks. However, by exploiting our inventive program analysis techniques one can dramatically limit the number of such lock sets and acquisition histories that need be tested for each control location as we shall now discuss.

Combining Lock Analysis With Program Analysis: Using static analysis on the control flow graph of a given thread, we can obtain a conservative estimate of the set of locks that may have been acquired by a thread having its program counter at a given control location, c. The result of this analysis $L_c$, is a superset of the set of locks that could possibly have been acquired at control location c, as well as any possible acquisition histories. Therefore, in performing a reachability analysis $EF(a_i \hat{\ } b_j)$, we only need to consider sets of locks L and L' such that $L \cap L' \supseteq L_{bj}$. Advantageously, this exponentially decreases the lock sets and acquisition histories that need be explored as, in practice, the nesting depth of locks is usually one therefore the cardinality of $L_c$ will usually be one as well.

Combining Lock Analysis With Program Slicing: According to Theorem 2, for a control location c in thread T we need to track histories of only those locks that are in possession of T at control location c instead of every lock as was done prior. Furthermore, for a lock l in possession of T at control location c, we may ignore all lock operations performed by T before l was acquired for the last time by T before reaching control location c as those do not affect the acquisition history of l. Advantageously, and according to our inventive method(s), such statements may be deleted using program slicing.

Deadlockability

Within our framework, since synchronization among threads is performed using locks, the only way a deadlock can occur is if there is a reachable global state s having a dependency cycle of the form:

$$T_{i_1} \to T_{i_2} \to \ldots \to T_{i_p} \to T_{i_1}$$

where $$T_{i_{k-1}} \to T_{i_k}$$

if the program counter of $T_{i_{k-1}}$ is currently at an acquire operation for a lock that it currently held by $T_{i_k}$. Therefore, to decide whether any thread in the given program CP is deadlockable, for each thread $T_i$ of CP we first construct the set of reachable configurations of the corresponding augmented thread $(T_i)_A$, defined above, where the control location is such that an acquire operation can be executed from it and denote the set of such configurations as $Acq_i$. We then construct a directed graph $D_{CP}$ whose nodes are elements of the set $\cup_i Acq_i$ and there is a directed edge from configuration $a=(a, L, AH_1, \ldots AH_m)$ to $a'=(a', L', AH_1', \ldots AH_m')$ iff there exist $i \neq i'$ such that:

1) $a \in Acq_i$, $a' \in Acq_{i'}$; and 2) a and a' both correspond to acquire operations, say, acquire(l) and acquire(l') respectively; and 3) thread $T_{i'}$ currently holds lock l required by thread $T_i$, viz., $l \in L'$. Then, the current program is deadlockable iff there exists a cycle $c_1 \to \ldots \to c_p \to c_1$ in $D_{CP}$ such that every pair of configurations $c_j = (c_j, L_j, AH_{j1}, \ldots, AH_{jm})$ and $c_{j'} = (c_{j'}, L_{j'}, AH_{j'1}, \ldots, AH_{j'm})$ is consistent, viz., $L_j \cap L_{j'} = 0$ and there do not exist locks $l_r \in L_j$ and $l_{r'} \in L_{j'}$ such that $l_r \in AH_{j'r'}$ and $l_{r'} \in AH_{j'r'}$.

By Theorem 2, consistency ensures that the global state encompassing a cycle is a reachable state of CP. Note that again—and in sharp contrast to the prior art—we have advantageously bypassed the state explosion problem by not constructing the state space of the system under consideration. Furthermore, using our inventive optimizations discussed prior, we can significantly reduce the number of possible lock sets and acquisition histories that need to be tracked for each acquire location in each thread. Consequently, and as can be readily appreciated by those skilled in the art, this ensures that the size of $D_{CP}$ remains tractable.

Undecidability for Programs with Non-Nested Locks

We now show that for concurrent programs comprising two threads $T_1$ and $T_2$ communicating via locks (not necessarily nested), he model checking problem for pairwise reachability, viz., properties of the form $EF(a_1 \hat{\ } b_2)$, where $a_1$ and $b_2$ are control states of $T_1$ and $T_2$ respectively, is undecidable.

Given a concurrent program CP comprising two threads $T_1$ and $T_2$ communicating via pairwise rendezvous, we construct a new concurrent program CP' comprising threads $T_1$ and $T_2$, by (weakly) simulating pairwise rendezvous using non-nested locks such that the set of control states of $T_1$ and $T_2$ are supersets of the set of control states of $T_1$ and $T_2$, respectively, and for control states $a_1$ and $b_2$ of $T_1$ and $T_2$, respectively, $CP|=EF(a_1 \hat{\ } b_2)$ iff $CP'|=EF(a_1 \hat{\ } b_2)$. This reduces the decision problem for pairwise reachability for threads communicating via pairwise rendezvous to threads communicating via locks. But, since pairwise reachability for threads communicating via pairwise rendezvous is undecidable, our result follows.

Simulating Pairwise Rendezvous Using Locks

We may now present how to simulate a given pair $$a \xrightarrow{m!} b$$

and $$c \xrightarrow{m?} d$$

of send and receive pairwise transitions, respectively. Recall that for this rendezvous to be executed, both the send and receive transitions must be simultaneously enabled, else neither transition can fire. Corresponding to the labels m! and m?, we first introduce the new locks $l_{m!}, l_{m?}$ and $l_m$.

Consider now the send transition tr:

$$a \xrightarrow{m!} b$$

of thread $T_1$ say. Our construction ensures that before $T_1$ starts mimicking tr in local state a it already has possession of lock $l_{m?}$. Then $T_1$ simulates $T_1$ via the following sequence of transitions:

$$a \xrightarrow{acquire(l_m)} a_1;$$

$$a_1 \xrightarrow{release(l_{m?})} a_2;$$

$$a_2 \xrightarrow{acquire(l_{m!})} a_3;$$

$$a_3 \xrightarrow{release(l_m)} b;$$

$$b \xrightarrow{acquire(l_{m?})} b_1;$$

$$b_1 \xrightarrow{release(l_{m!})} b_2.$$

Similarly, we assume that $T_2$ has possession of $l_{m!}$ before it starts mimicking tr':

$$c \xrightarrow{m!} d.$$

Then $T_2$ simulates tr' by firing the following sequence of translations;

$$c \xrightarrow{acquire(l_{m?})} c_1;$$

$$c_1 \xrightarrow{release(l_{m!})} c_2;$$

$$c_2 \xrightarrow{acquire(l_m)} c_3;$$

$$c_3 \xrightarrow{release(l_{m?})} d;$$

$$d \xrightarrow{acquire(l_{m!})} d_1;$$

$$d_1 \xrightarrow{release(l_m)} d_2.$$

Our reason for letting thread $T_1$ acquire $l_{m?}$ at the outset is to prevent thread $T_2$ from firing translation $$c \xrightarrow{m?} d$$

without synchronizing with tr:

$$a \xrightarrow{m!} d.$$

To initiate execution of the pairwise rendezvous involving tr, thread $T_1$ releases lock $l_{m?}$ and only when lock $l_{m?}$ is released can $T_2$ pick it up in order to execute the matching receive transition labeled m?. But, before $T_1$ releases lock $l_{m?}$ it first acquires $l_m$. Note that this trick involving chaining—wherein before releasing a lock a thread is forced to pick up another lock—advantageously provides us the ability to introduce a relative ordering on the firing of local transitions of $T_1$ and $T_2$ which in turn allows us to simulate (in a weak sense) the firing of the pairwise rendezvous comprising tr and tr'.

As can now be seen, and due to the chaining, the local transitions in the two sequences defined above can ONLY be interleaved in the following order:

$$a \xrightarrow{acquire(l_m)} a_1;$$

$$a_1 \xrightarrow{release(l_{m?})} a_2;$$

$$c \xrightarrow{acquire(l_{m?})} c_1;$$

$$c_1 \xrightarrow{release(l_{m!})} c_2;$$

$$a_2 \xrightarrow{acquire(l_{m!})} a_3;$$

$$a_3 \xrightarrow{release(l_m)} b;$$

$$c_2 \xrightarrow{acquire(l_m)} c_3;$$

$$c_3 \xrightarrow{release(l_{m?})} d;$$

$$b \xrightarrow{acquire(l_{m?})} b_1;$$

$$b_1 \xrightarrow{release(l_{m!})} b_2;$$

$$d \xrightarrow{acquire(l_{m!})} d_1;$$

$$d_1 \xrightarrow{release(l_m)} d_2.$$

It is important to note at this time that the use of overlapping locks is essential when implementing chaining, thereby forcing a pre-determined order of firing of the local transitions which cannot be accomplished using nested locks alone. And since the model checking problem for pairwise reachability is known to be undecidable for threads communicating using pairwise rendezvous (See, e.g., G. Ramalingam, "Context-Sensitve Synchronization-Sensitive Analysis Is Undecidable", ACM Trans. Program. Lang. Syst., Vol. 22(2), pp. 416-430, 2000.), and since we can, by the above result, simulate pairwise rendezvous using locks in a way so as to preserve pairwise reachability, we have the following undecidability result.

Theorem 3: The model checking problem for pairwise reachability is undecidable for concurrent programs comprised of two threads communicating using locks.

The Daisy File System Case Study

We have evaluated our inventive technique(s) to find bugs in the Daisy file system, which is known by those skilled in the art as a useful benchmark in analyzing the efficiency of different methodologies for verifying concurrent programs. As is known, Daisy is a 1KLOC Java implementation of a toy file system where each file is allocated a unique inode that stores the file parameters and a unique block which stores data. An interesting feature of Daisy, is that it has fine-grained locking such that access to each file, inode or block is guarded by a dedicated lock. Moreover, the acquire and release of these locks is guarded by a "token" lock. Thus control locations in the Daisy program might possible have multiple open locks and furthermore the acquire and release of a given lock may occur in different procedures.

We have incorporated our analysis technique into framework for model checking sequential software, namely F-Soft (See, e.g, F. Ivancic, Z. Yang, M. Ganai, A. Gupts, and P. Ashar, "Efficient SAT-based Bounded Model Checking for Software Verification", Symposium on Leveraging Applications of Formal Methods, 2004). We have implemented the decision procedure for pairwise reachability and used it to detect race conditions in the Daisy file system.

Towards that end, we check that for all n, any n-threaded Daisy program does not have a given race condition. And, since a race condition may be expressed as pairwise reachability, using Proposition 1, we see that it is sufficient to check a 2-thread instance.

Currently, F-Soft only accepts programs written in C, so we must first manually translate the Daisy file system code (which is written in Java) into C. Furthermore, to reduce the model sizes, we truncate the size of the data structures that model the disk, inodes, blocks, file names, etc., which were not relevant to the race conditions we checked—thereby resulting in a sound and complete small-domain reduction. We emphasize at this point that other than redefining the constants limiting these sizes, no code restructuring was performed on the translated C-code.

Now, given a race condition to be verified, we use a fully automated procedure to generate two augmented thread representations (Control Flow Graphs—CFG) on which the verification is conducted individually. As can be appreciated, a race condition occurs only if the labels in both of the modified threads are reachable. Using this fully automated procedure, we have determined the existence of race conditions, as verified by other researchers.

First, Daisy maintains an allocation area where, for each block in the file system, a bit is assigned either 0 or 1 to indicate whether the block has been allocated to a file or not. As is generally known, a disk operation reads/writes an entire byte (8 bits) and not single bits. Accordingly, two threads accessing two different files might access two different blocks. However, since bytes are not guarded by locks, in order to set their allocation bits these two different threads may access the same byte in the allocation block containing the allocation bit for each of these locks thereby establishing a race condition.

For the data race described above, the statistics are as follows. The pre-processing phase which includes slicing, range analysis, using static analysis to find the possible set of open locks at the control state corresponding to the error label and then incorporating the acquisition history statements in the CFGs corresponding to the threads for only these locks took 77 secs (Intel Pentium-45, 3.20 GHz CPU, 2 MB RAM) for both of the threads. The two model checking runs took 5.3 and 21.67 secs and the error labels corresponding to the race condition were reached at depths of 75 and 333, respectively, using SAT-based BMC in F-Soft.

In the Daisy file system, reading/writing a particular byte on a disk is broken down into two operations: a seek operation that mimics the positioning of the disk head and a read/write operation that transfers the actual data. Due to this separation between seeking and transfer, a race condition may occur. For example, when reading two disk locations, say n and m, we must make sure that seek(n) is followed by read(n) without seek(m) or read(m) scheduled in-between. Here the pre-processing phase took about the same time as before. The model checking runs on the two threads took 15 and 35 seconds.

While our inventive teachings have now been shown and discussed with respect to several examples, our invention is not so limited. In particular, it is understood that our inventive augmented threads and method of individually analyzing same will be further improved by optimization. Accordingly, our invention should only be limited by the scope of the following claims.

What is claimed is:

1. A method for the static analysis of concurrent multi-threaded software comprising the computer implemented steps of:
    scanning the software code to determine locations in individual threads where lock acquisition and lock release operations take place;
    constructing, augmented versions of the individual threads by modifying those locations in the individual threads to keep track of patterns of at least one of a lock acquisition and a lock release such that an augmented version of each individual thread is constructed; and
    analyzing the individual augmented threads for correctness by verifying individually, each of the augmented threads.

2. The method according to claim 1 wherein modifying step further comprises the steps of:
    adding, for each lock accessed or released within each of the individual threads, additional variables indicative of both possession and history of the lock.

3. The method according to claim 2 wherein said additional variable indicative of possession of the lock is a single variable indicative of lock possession.

4. The method according to claim 3 wherein said additional variable indicative of the history of an individual lock "L" comprises a set of locks that were acquired and released since the last acquisition of lock "L".

5. The method according to claim 4 wherein said lock history is constructed only for open locks.

6. The method according to claim 2 further comprising the step of:
    approximating, acquisition histories at each control location within the software.

7. The method according to claim 6 wherein said approximating step further comprises the steps of:
    performing, a breadth first search of the control flow of the program to track acquisition history(ies) at a particular control location.

8. A method for detecting data races in computer software, said method comprising the computer implemented steps of:
    automatically introducing, error labels at control locations within the computer software, said control locations being those locations in the software where there is access to a shared variable wherein at least one access to the shared variable is a write operation; and
    determining the reachability of pairs of the error labels wherein at least one of labels comprising a pair of error labels is a write access by
        scanning the software code to determine locations in individual threads where at least one of a lock acquisition and lock release operation take place;
        constructing augmented versions of the individual threads; and
        analyzing the individual augmented threads for correctness.

9. A method for checking concurrent, multi-threaded software programs for deadlock conditions, said method comprising the computer implemented steps of:
    automatically identifying, all acquire-lock operations in each thread;
    constructing, augmented versions of the threads;
    creating, a lock dependency graph describing the augmented threads; and
    checking for cycles in the lock dependency graph where the presence of a cycle indicates a deadlock.

10. A method for detecting whether a thread in a concurrent multi-threaded program can deadlock, said method comprising the computer implemented steps of:

constructing, a lock dependency graph of the multi-threaded program; and determining, whether there exists a cycle that is reachable starting from some control location within the thread;

wherein said lock dependency graph constructing step comprises the steps of:

automatically identifying, all acquire-lock operations in each thread;

constructing, augmented version of the threads;

creating, an edge from an acquire (L1) in T1 to an acquire (L2) in T2 wherein a lock L1 is held by a thread T2 when the computer program counter or execution is at a control location, and two control locations (acquire (L1) in T1 and acquire (L2) in T2)) are simultaneously reachable; and wherein vertices of the graph correspond to certain control locations (acquire) in the threads and edges correspond to (dependency) relationships between the two.

* * * * *